US009076177B2

(12) United States Patent
Gotanda

(10) Patent No.: US 9,076,177 B2
(45) Date of Patent: Jul. 7, 2015

(54) SYSTEM AND METHOD FOR PROVIDING COMMODITY INFORMATION, AND STORAGE MEDIUM CONTAINING RELATED PROGRAM

(71) Applicant: Toshiba Tec Kabushiki Kaisha, Tokyo (JP)

(72) Inventor: Tsuyoshi Gotanda, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 352 days.

(21) Appl. No.: 13/797,423

(22) Filed: Mar. 12, 2013

(65) Prior Publication Data

US 2013/0259320 A1 Oct. 3, 2013

(30) Foreign Application Priority Data

Mar. 30, 2012 (JP) ................................. 2012-082404

(51) Int. Cl.
*G06Q 30/06* (2012.01)
*G07G 1/12* (2006.01)
*G07G 1/00* (2006.01)

(52) U.S. Cl.
CPC ........ *G06Q 30/0623* (2013.01); *G06K 2209/17* (2013.01); *G07G 1/12* (2013.01); *G07G 1/0054* (2013.01)

(58) Field of Classification Search
CPC . G06K 9/00; G06K 9/00201; G06K 2209/17; G06K 2209/27; G06T 2207/30128; G06Q 30/0623; G07G 1/0045; G07G 1/0054; G07G 1/0063
See application file for complete search history.

(56) References Cited

U.S. PATENT DOCUMENTS

| 7,909,248 | B1 * | 3/2011 | Goncalves | ..................... 235/383 |
| 2009/0060259 | A1 * | 3/2009 | Goncalves | ..................... 382/100 |
| 2010/0158310 | A1 * | 6/2010 | McQueen et al. | ............. 382/100 |

(Continued)

FOREIGN PATENT DOCUMENTS

| JP | 2003271650 A | 9/2003 | ............... G06F 17/30 |
| JP | 2010198137 A | 9/2010 | ............... G07G 1/00 |

OTHER PUBLICATIONS

Office Action dated Feb. 25, 2014, filed in corresponding Japanese Patent Application No. 2012-082404, with English translation.

(Continued)

*Primary Examiner* — Andrew W Johns
(74) *Attorney, Agent, or Firm* — Patterson & Sheridan, LLP

(57) ABSTRACT

According to one embodiment, A system for providing commodity information includes a storage module configured to store a plurality of data files, each data file corresponding to a commodity and including a plurality of data fields, each of the data fields comprising: commodity identification information data, symbol identification data, detailed commodity information data, and producer information data, a first recognition module configured to identify the commodity by comparing an input commodity image to the commodity identification information data, a second recognition module configured to identify a symbol on the commodity by comparing an input symbol image to the symbol identification data, and an output module. The output module outputs the detailed commodity information data based on the identified commodity, and outputs the producer information data based on the identified symbol.

20 Claims, 13 Drawing Sheets

(56) References Cited

U.S. PATENT DOCUMENTS

2012/0243779 A1    9/2012  Nakai et al. .................. 382/159
2013/0279748 A1*  10/2013  Hastings .................. G06K 9/46

OTHER PUBLICATIONS

Rui Ishiyama; Device and element technology to support M2M service—Traceability of agricultural products by individual recognition using image recognition; NEC Technical Report; NEC Corporation; Nov. 2011; vol. 64, No. 4, pp. 90-93 (Japanese language).

Rui Ishiyama; Device and element technology to support M2M service—Traceability of agricultural products by individual recognition using image recognition; NEC Technical Report; NEC Corporation; Dec. 2011; vol. 6, No. 4, pp. 95-97 (English language) (includes statement of relevance of NPL document 2 above).

* cited by examiner

FIG.3
| COMMODITY CODE | COMMODITY INFORMATION | | | FIRST COMMODITY DATA | FLAG INFORMATION |
|---|---|---|---|---|---|
| | COMMODITY CATEGORY | COMMODITY NAME | UNIT PRICE | | |
| 00001 | FRUIT | APPLE (FUJI) | 150 YEN | 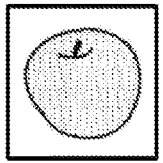 | 1 |
| 00002 | VEGETABLE | CARROT | 100 YEN | 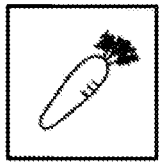 | 0 |
| ⋮ | ⋮ | ⋮ | ⋮ | ⋮ | ⋮ |
F1

SYSTEM AND METHOD FOR PROVIDING COMMODITY INFORMATION, AND STORAGE MEDIUM CONTAINING RELATED PROGRAM

CROSS-REFERENCE TO RELATED APPLICATION

This application is based upon and claims the benefit of priority from Japanese Patent Application No. 2012-082404, filed Mar. 30, 2012, the entire contents of which are incorporated herein by reference.

FIELD

Embodiments described herein relate generally to a system managing the traceability information of a commodity.

BACKGROUND

A traceability system is used for managing the information of the circulation process of a commodity. The information of the circulation process refers to the production district, the production date and the like. The traceability system is capable of specifying the information of the distribution process of each commodity based on a recognition code expressed by a bar code or a wireless IC tag attached to each commodity.

BRIEF DESCRIPTION OF THE DRAWINGS

FIG. 3 is a schematic structural diagram of a file F1 of the first embodiment.

DETAILED DESCRIPTION

Figure 1:
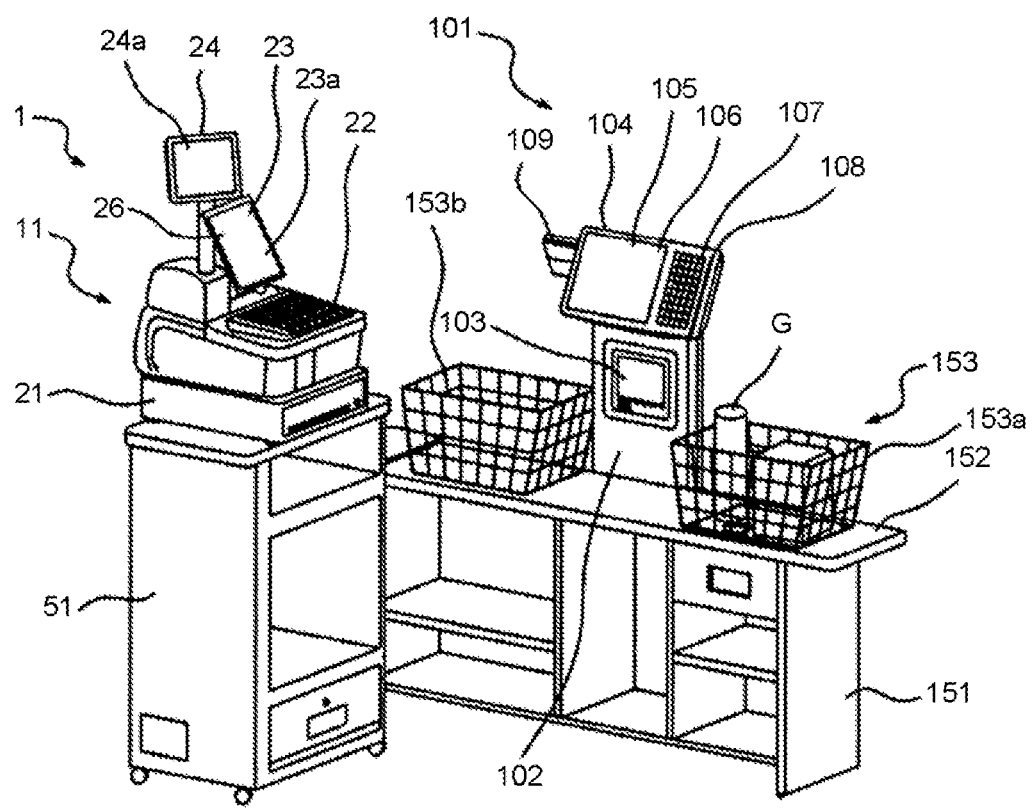
FIG. 1 is an outside view of a settlement system of a first embodiment.

According to one embodiment, a system for providing commodity information is disclosed. The system comprises a storage module configured to store a plurality of data files, each data file corresponding to a commodity and including a plurality of data fields, each of the data fields comprising: commodity identification information data, symbol identification data, detailed commodity information data, and producer information data. The system further comprises a first recognition module configured to identify the commodity by comparing an input commodity image to the commodity identification information data, a second recognition module configured to identify a symbol on the commodity by comparing an input symbol image to the symbol identification data, and an output module. The output module outputs the detailed commodity information data based on the identified commodity, and outputs the producer information data based on the identified symbol.

According to another embodiment, a method of providing commodity information is disclosed. The method comprises accessing a storage module configured to store a plurality of data files, each data file corresponding to a commodity and including a plurality of data fields, each of the data fields comprising: commodity identification information data, symbol identification data, detailed commodity information data, and producer information data. The method further comprises identifying the commodity by comparing an input commodity image to the commodity identification information data, identifying a symbol on the commodity by comparing an input symbol image to the symbol identification data, outputting the detailed commodity information data based on the identified commodity, and outputting the producer information data based on the identified symbol.

According to another embodiment, a non-transitory computer readable storage medium that stores a computer program is disclosed. The program causes a one or more CPUs to perform a process for providing commodity information, the process comprises accessing a storage module configured to store a plurality of data files, each data file corresponding to a commodity and including a plurality of data fields, each of the data fields comprising: commodity identification information data, symbol identification data, detailed commodity information data, and producer information data. The process further comprises identifying the commodity by comparing an input commodity image to the commodity identification information data, identifying a symbol on the commodity by comparing an input symbol image to the symbol identification data, outputting the detailed commodity information data based on the identified commodity, and outputting the producer information data based on the identified symbol.

Hereinafter, the embodiments will be described with reference to the drawings. In the drawings, the same reference numerals denote the same or similar portions respectively.

A first embodiment will be described with reference to FIG. 1 to FIG. 10. The first embodiment is an example applied to a settlement system arranged in a store of a supermarket.

FIG. 1 shows an outside view of the checkout system 1 of the first embodiment. The checkout system 1 includes a POS terminal 11, a counter 151 and a commodity reading apparatus 101. The POS terminal 11 is arranged on a checkout counter 51 with a drawer 21. The drawer 21 internally includes a space containing coins or paper money. The drawer 21 is controlled by a signal from the POS terminal 11.

The POS terminal 11 includes a keyboard 22, a display device 23 and a display device 24. The keyboard 22 is an input apparatus receiving the input from an operator. The display device 23 mainly displays information used for the operator. The display device 23 includes a touch panel 26 on its surface 23a. The touch panel 26 is capable of detecting a position contacted by the hand of the operator. The display device 24 mainly displays information used for a customer. The display device 24 may also include a touch panel on a surface 24a. The POS terminal 11 rotatably supports the display device 24.

The commodity reading apparatus 101 may be positioned on the counter 151. The commodity reading apparatus 101 is capable of sending and receiving data with the POS terminal 11.

The commodity reading apparatus 101 includes a housing 102. The housing 102 includes a reading window 103 at a front surface and internally includes a commodity reading section 110. The commodity reading section 110 includes an image sensor 164. The image sensor 164 detects light incident from the reading window 103 and converts it into the image data.

The housing 102 includes an input-output section 104 at an upper part. The input-output section 104 includes a display device 106, a keyboard 107, a groove 108 and a display device 109. The display device 106 includes a touch panel 105 on its surface. The display device 106 mainly displays the information used for the operator. The groove 108 internally includes a card reader used for reading a magnetic portion of a credit card. The display device 109 displays the information used for the customer.

The customer may place a shopping basket 153a at a position next to one side of the commodity reading apparatus 101 and further on the upper surface 152 of the counter 151. The operator may prepare an empty shopping basket 153b on the other side of the commodity reading apparatus 101. The operator may take out a commodity G in the shopping basket 153a and move the commodity G towards the front surface of the reading window 103. The image sensor 164 acquires the image data of the commodity G through the reading window 103. After the image sensor 164 acquires the image data, the operator puts the commodity G in the shopping basket 153b. By such motion of the operator, the commodity reading apparatus 101 acquires the image data of the commodity.

Figure 2:
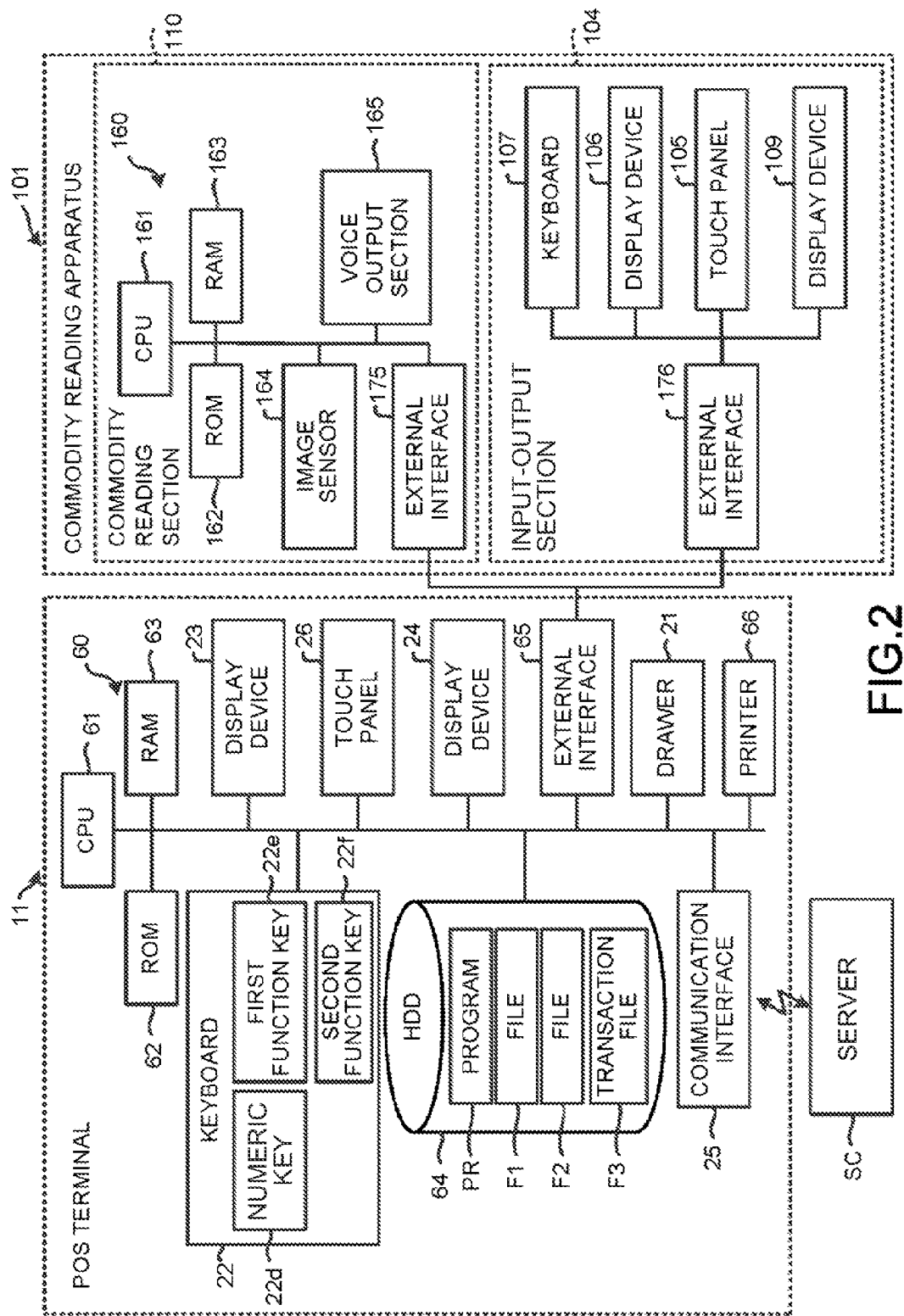
FIG. 2 is a hardware block diagram of a POS terminal and a commodity reading apparatus of the first embodiment.

FIG. 2 shows a hardware block diagram of the POS terminal 11 and the commodity reading apparatus 101. A microcomputer 60 controls the POS terminal 11. The microcomputer 60 includes a CPU (Central Processing Unit) 61, an ROM (Read Only Memory) 62 and an RAM (Random Access Memory) 63. The CPU 61, the ROM 62 and the RAM 63 are mutually connected by a signal line.

The microcomputer 60 is electrically connected with the drawer 21, the keyboard 22, the display device 23, the display device 24, the touch panel 26, an HDD (Hard Disk Drive) 64, a printer 66, a communication interface 25 and an external interface 65.

The keyboard 22 at least includes a numeric key 22d, a first function key 22e and a second function key 22f. The numeric key 22d include a plurality of number keys and operational character keys. The printer 66 prints receipt information for the customer on a roll paper.

The HDD 64 stores an application program, a file F1, a file F2 and a transaction file F3. The CPU 61 copies the application program to the RAM 63 when the POS terminal 11 is started up. The CPU 61 executes the application program stored in the RAM 63. The CPU 61 reads out the data stored in the HDD 64 based on the request of the application program.

The external interface 65 is connected with the commodity reading apparatus 101. The communication interface 25 is connected with a server CS through a network. The server CS includes an HDD storing the master files of the file F1 and F2. The POS terminal 11 periodically synchronizes between the master files and the files F1 and F2.

The commodity reading apparatus 101 includes the commodity reading section 110 and an input-output section 104.

The commodity reading section 110 includes a microcomputer 160, the image sensor 164, a voice output section 165 and an external interface 175. The microcomputer 160 controls the image sensor 164, the voice output section 165 and the external interface 175. The microcomputer 160 includes a CPU 161, an ROM 162 and an RAM 163. A signal lines connect the CPU 161, the ROM 162 and the RAM 163 with each other. The RAM 163 stores the program executed by the CPU 161.

A sensor in a color/monochrome CCD type or a color/monochrome CMOS type is capable of being applied as the image sensor 164. The image sensor 164, for example, generates the image data with a 30 Fps of frame rate and stores the image data in the RAM 163.

The voice output section 165 includes a sound generator, a loudspeaker and the like. The sound generator converts a warning sound or voice message previously stored in the RAM 163 into an analog signal. The loudspeaker converts the analog signal into a sound.

The input-output section 104 includes the touch panel 105, the display device 106, the display device 109, the keyboard 107 and an external interface 176. The input-output section 104 is connected to the commodity reading section 110 and the POS terminal 11 by the external interface 176.

FIG. 3 schematically shows a structure of the file F1. The file F1 is a Price Look Up Table controlled by an SQL language. The record of the file F1 includes a plurality of field values. The file F1 include at least the field names of "commodity code", "commodity information", "first commodity data" and "flag information". The commodity code is a unique ID used for specifying the variety of the commodity. The commodity code may include a unique ID specified by a UPC (Universal Product Code), an EAN (European Article Number) and a JAN (Japanese Article Number) and the like. The file F1 is a data aggregate of the plurality of records. Each record includes the commodity code as a primary key. The primary key is the unique ID used for specifying the record in the same file.

The commodity information includes a commodity category, a commodity name, a unit price and the like. The commodity category denotes a fruit, a vegetable and the like. The first commodity data, for example, is the image data of the commodity. The flag information denotes whether or not the file F2 includes the relevant records which have a same commodity code. For example, the value "1" of the flag information denotes that the file F2 includes the relevant record. The value "0" of the flag information denotes that the file F2 does not include the relevant record. The image data of the commodity may not include the flag information.

The microcomputer 160 retrieves the commodity code which is the most similar to the image data generated by the image sensor 164 from the first commodity data of the file F1. As a result of this retrieval, the microcomputer 160 may acquire one commodity code. Based on the commodity code, the microcomputer, for example, is capable of specifying the variety (Red Delicious, Fuji and the like) of an apple.

The first commodity data may permit the feature quantity which calculates the image data. The feature quantity includes, but not limited to, a color, a surface concave-convex status, a pattern and a marking. The feature quantity may not include the information of a flag attached to the commodity.

Figure 4:
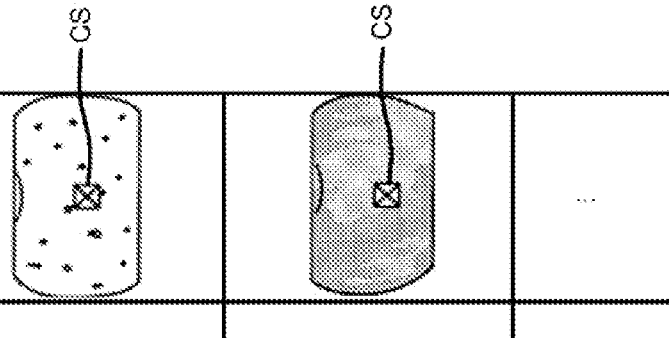
FIG. 4 is a schematic structural diagram of a file F2 of the first embodiment.

FIG. 4 schematically shows a structure of the file F2. The file F2 is a table controlled by the SQL language and is an aggregation of the records with the plurality of field values. In the first embodiment, field names of file F2 are the commodity code, a production district, a grade, a sugar content (%), a producer, a harvest date, a commodity characteristic code and second commodity data. However, a manager of the file F2 adds or cancels the field names in response to the information provided for the customer. The production district, the grade, the sugar content (%) and the harvest date are commodity characteristic information and are the information which does not exist in the file F1. The commodity characteristic information is the information including the production data and the distribution data of the commodity and is used for traceability.

The commodity code of the file F2 denotes the commodity of the variety the same as the commodity code of the file F1. The commodity code of the file F2 is not the primary key. The commodity characteristic code is the primary key in the file F2. This means that, for example, the file F2 includes 100 records in the condition that the manager registers 100 commodities with the same commodity codes in the file F2.

The second commodity data, for example, are the image data of the commodity. The commodity includes a symbol CS such as a label, a branded or ink printed sign, and the like. The image data recorded in the second commodity data includes the symbol CS. The symbol CS is preferentially positioned in the center of the image data. The image data includes the symbol CS and the surface image of the commodity around the symbol CS. However, the image data may not need to include the contour of the commodity.

The second commodity data may be also the feature quantity of the image data including the symbol CS. The feature quantity includes, but not limited to, the color, the surface concave-convex status, pattern and a marking.

The microcomputer 160 retrieves the commodity which is the most similar to the image data including the symbol CS generated by the image sensor 164 from the second commodity data of the file F2. As a result of this retrieval, the microcomputer 160 acquires one commodity characteristic code. Based on the commodity characteristic code, the microcomputer 160 may acquire the data of the production district or a harvest period.

Figure 5:
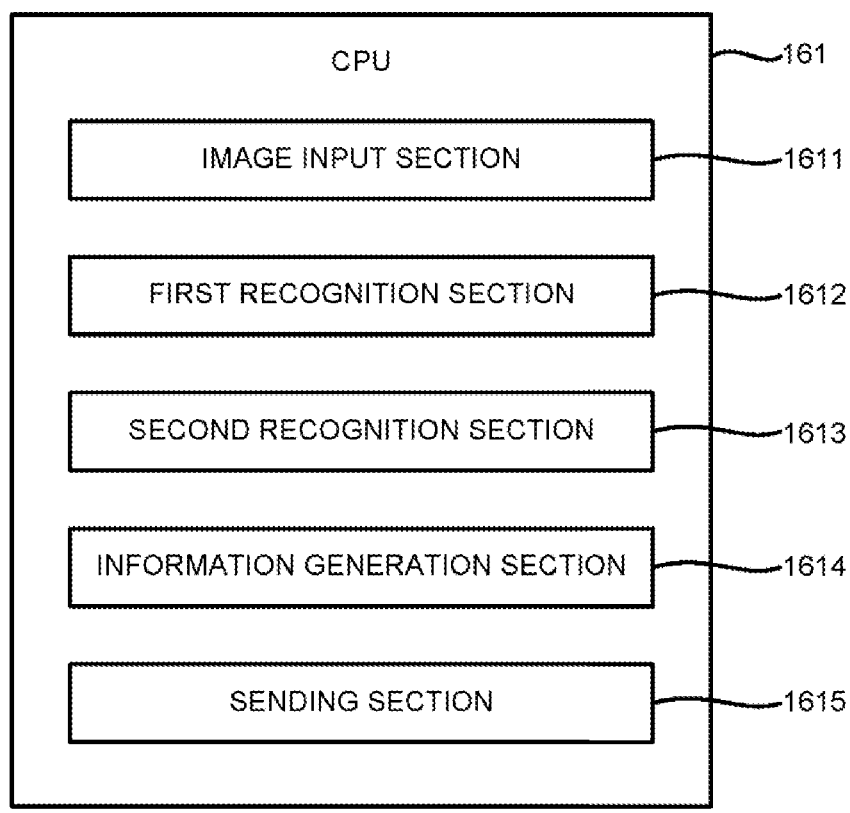
FIG. 5 is a functional block diagram of a program executed by a CPU of the commodity reading apparatus of the first embodiment.

FIG. 5 shows a functional block diagram of the program executed by the CPU 161 of the commodity reading apparatus 101. The functional block includes an image input section 1611, a first recognition section 1612, a second recognition section 1613, an information generation section 1614 and a sending section 1615.

The image input section 1611 sends ON signal and OFF signal to the image sensor 164. The image sensor 164 generates the image data with the 30 Fps of frame rate when receiving ON signal. The image sensor 164 sends the image data to the RAM 163 in sequence.

The first recognition section 1612 outputs the commodity code based on the image data generated by the image sensor 164. First of all, the first recognition section 1612 extracts a contour line from the image data and stores it in the RAM 163. The first recognition section 1612 compares a plurality of contour lines and judges whether or not the image data includes the commodity G.

The first recognition section 1612 extracts the contour line of the commodity G and the feature quantity of the image of an area surrounded by the contour line. The first recognition section 1612 compares the feature quantity with the first commodity data of the file F1 and calculates a similarity ratio.

Calculation of a similarity ratio is described in U.S. Patent Publication No. 2012/0243779, which is hereby incorporated by reference as if set forth herein in its entirety. In the present embodiment, the first commodity data includes reference feature values ($a_{11}, a_{12}, \ldots, a_{1N}$). The contour lines extracted by the first recognition section 1612 include scanned image feature values ($b_{11}, b_{12}, \ldots, b_{1N}$). The similarity ratio is calculated as [the number of $a_{1N}=b_{1N}$]/N.

The first recognition section 1612 sends the commodity code whose similarity ratio is biggest or the commodity code whose similarity ratio is above a predetermined threshold value to the information sending section 1615.

The second recognition section 1613 outputs the commodity characteristic code based on the image data received from the image sensor 164. First of all, the second recognition section 1613 acquires the flag information from the file F1 based on the commodity code specified by the first recognition section 1612. If the value of the flag information is "0", the second recognition section 1613 ends the processing. If the value of the flag information is "1", the second recognition section 1613 retrieves the symbol CS from the image data received by the image sensor 164. The second recognition section 1613 may use a pattern matching technology comparing the symbol CS stored in the RAM 163 with the image data.

If the image data includes the symbol CS, the second recognition section 1613 calculates the feature quantity from the image data around the symbol CS. The feature quantity includes, but not limited to, the color, the surface concave-convex status, patterns and marking. The feature quantity, for example, may include the relative position of the surface concave-convex status to the symbol CS.

The second recognition section 1613 compares the feature quantity with the second commodity data of the file F2 and calculates the similarity ratio. The first recognition section 1612 sends the commodity characteristic code whose similarity is 100% or is biggest or is above a specified value to the sending section 1615. The sending section 1615 sends the commodity code and the commodity characteristic code to the POS terminal 11. The second recognition section 1613 may also compare the feature quantity with the second commodity data of the records which include the commodity code outputted by the first recognition section 1612 in the file F2.

If the image data does not include the symbol CS, the second recognition section 1613 sends an error signal to the information generation section 1614.

A technology recognizing an object from these image data is called as "Generic Object Recognition". The "Generic Object Recognition" is described in the following two publications:

Kenji Yanai, "The Current State and Future Directions of Generic Object Recognition", Transactions of Information Processing Society of Japan, Vol. 48, No. SIG16 retrieved on Aug. 10, 2010, at
mm.cs.uec.ac.jp/IPSJ-TCVIH-Yanai.pdf; and Jamie Shotton et. al, "Semantic Text on Forests for Image Categorization and Segmentation", retrieved on Aug. 10, 2010 at
citeseerx.ist.psu.edu/viewdoc/download?doi=10.1.1.145.3036&rep=rep1&type=pdf].

Both of these publications are incorporated by reference as if set forth herein in their entirety.

Figure 6:
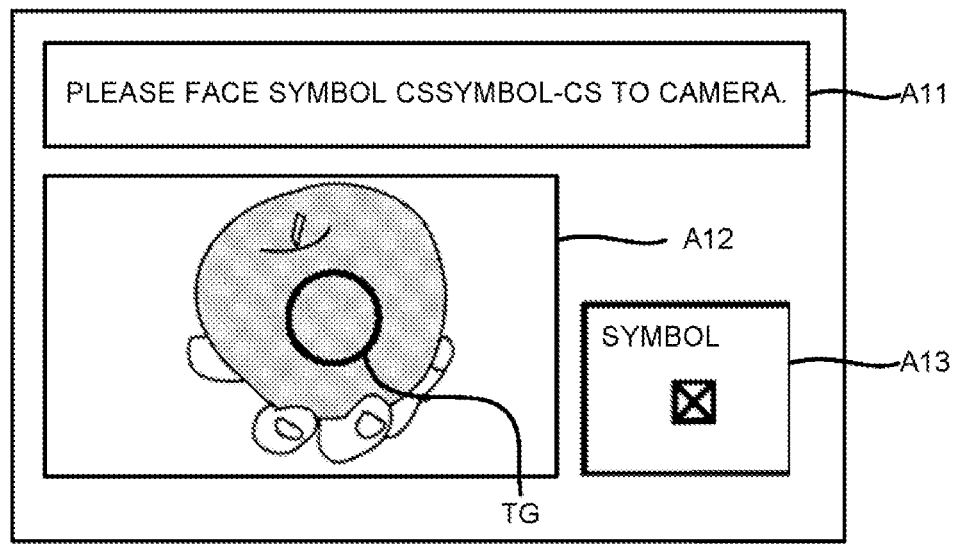
FIG. 6 is a screen layout including error information of the first embodiment.

FIG. 6 shows a screen layout including error information. If the second recognition section 1613 may not detect the symbol CS, the information generation section 1614 generates the screen layout including the error information. An area A11 is an area denoting the error information. An area A12 is an area denoting the image data generated by the image sensor 164. The information generation section 1614 is capable of laying out an area TG in the area A12. The area TG is a target mark for guiding the symbol CS into the area TG. The area TG is effective for improving the recognition rate of the second recognition section 1613.

The information generation section 1614 generates a screen displaying information urging the operator to enter the symbol CS into the area A12 on the area A11. The operator confirms the position of the symbol CS by viewing the error information.

If the first recognition section 1612 specifies the commodity code, the information generation section 1614 may specify the symbol CS based on the commodity code. The information generation section 1614 is capable of displaying the specified symbol CS in an area A13. If the specified symbols CS are multiple, the candidates of all the symbols CS may be displayed in the area A13. This function is convenient for the operator. This function requires the file F1 to include the symbol CS in one of the field values.

Figure 7:
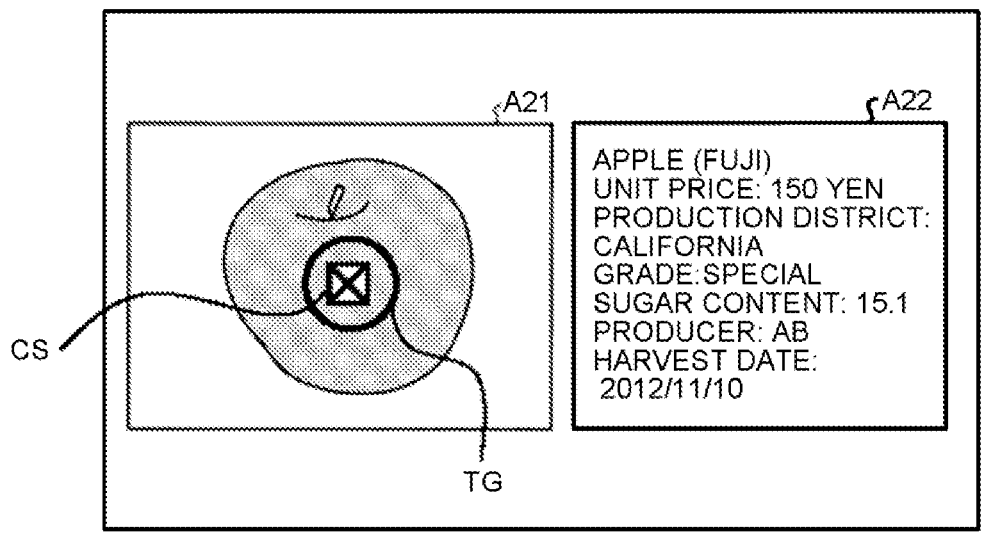
FIG. 7 is a screen layout including commodity information of the first embodiment.

FIG. 7 shows a screen layout including the commodity information. The display devices 106 and 109 display the screen layout. The information generation section 1614 generates the screen layout when the first recognition section 1612 and the second recognition section 1613 normally exert the functions. An area A21 displays the image data used by the first recognition section 1612. An area A22 displays the commodity information.

The information generation section 1614 specifies the record of the file F1 based on the commodity code output by the first recognition section 1612. The information generation section 1614 acquires the necessary information from the specified record.

The information generation section 1614 specifies the record of the file F2 based on the characteristic code output by the second recognition section 1613. The information generation section 1614 acquires the necessary information from the specified record. The information generation section 1614 places the information acquired from the files F1 and F2 in the area 22.

Figure 8:
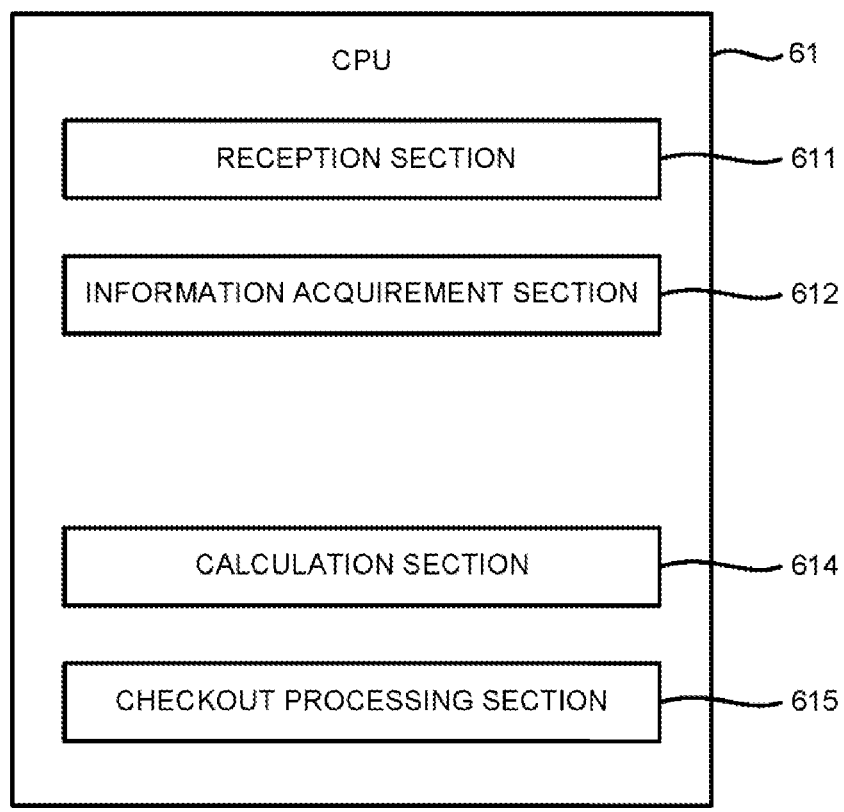
FIG. 8 is a functional block diagram of a program executed by a CPU of the POS terminal of the first embodiment.

FIG. 8 shows a functional block diagram of the program executed by the CPU 61 of the POS terminal 11. The functional block includes a reception section 611, an information acquisition section 612, a calculation section 614 and a checkout processing section 615.

The reception section 611 receives the commodity code and the characteristic code from the sending section 1615. The information acquisition section 612 specifies the record of the file F1 based on the commodity code received by the sending section 1615. The information acquisition section 612 specifies the record of the file F2 based on the characteristic code received by the sending section 1615. The information acquisition section 612 acquires the commodity information and the commodity characteristic information from the specified records of the files F1 and F2 and stores the information in the transaction file F3.

The transaction file F3 is a table managing one transaction by using one unique ID. The transaction file F3 is controlled by using the SQL language. The transaction file F3 may include the commodity code, the unit price and a determination flag as the field name.

The calculation section 614 calculates the total amount of one transaction according to the commodity unit price and number information recorded in the transaction file F3. The calculation section 614 calculates change according to the total amount and the deposit received from the customer.

The checkout processing section 615 appends the determination flag to the record stored in the transaction file F3. The checkout processing section 615 generates the information for a receipt and sends it to the printer 66.

Figure 9:
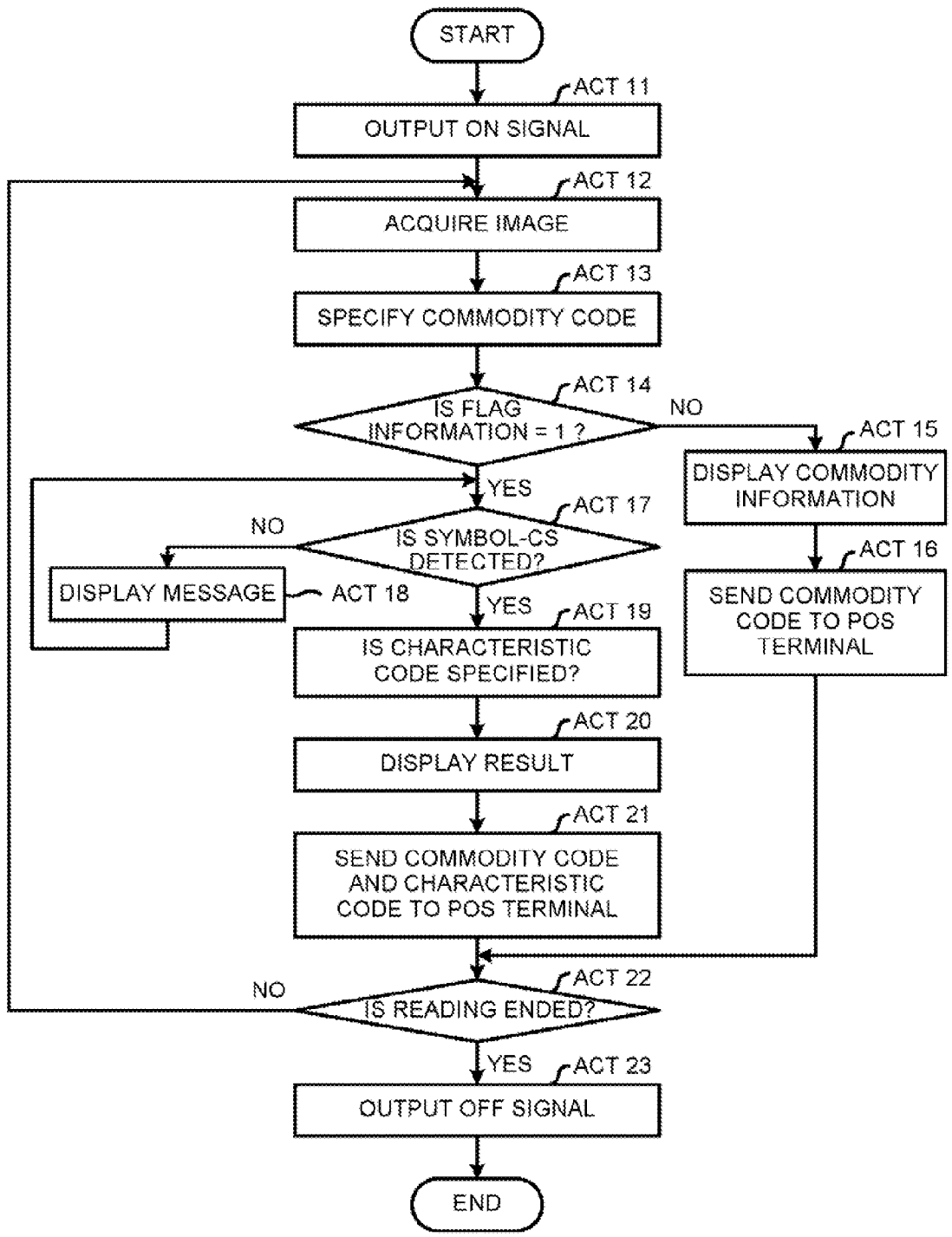
FIG. 9 is a processing flow of a program executed by the CPU of the commodity reading apparatus of the first embodiment.

FIG. 9 shows a processing flow of the program executed by the CPU161 of the commodity reading apparatus 101. The image input section 1611 sends ON signal to the image sensor 164 (Act11). The image input section 1611 acquires the image data stored in the RAM 163 (Act12). The first recognition section 1612 outputs the commodity code to the second recognition section 1613 after specifying the variety of commodity G (Act13). If the first recognition section 1612 outputs a plurality of commodity codes, the information generation section 612 may generate one or more buttons, each button including the photo of the commodity with the plurality of commodity codes, and the display device 106 displays the one or more buttons. The operator may select one button from the one or more buttons. The second recognition section 1613 may receive the commodity code selected by the operator.

The second recognition section 1613 reads out the field value of the flag information in the file F1 based on the commodity code and checks whether or not the field value is "1" (Act14). If the field value is "0", the second recognition section 1613 ends the processing (Act14: No). The information generation section 612 retrieves the corresponding record from the file F1 based on the commodity code. The information generation section 612 generates the image data used for the display devices 106 and 109 after reading out the record (Act15). The sending section 1615 sends the commodity code to the POS terminal 11 (Act16).

If the field value of the flag information is "1" (Act14:Yes), the second recognition section 1613 checks whether or not the symbol CS is included in the image data stored in the RAM 163 (Act17). If the image data does not include the symbol CS, the information generation section 612 generates the screen layout including the error information shown in FIG. 7 and sends the screen layout to the display device 106 (Act18). The second recognition section 1613 may wait until new image data are received.

If the image data include the symbol CS, the second recognition section 1613 specifies the characteristic code after retrieving the field value of the second commodity data in the file F2 (Act19). The information generation section 1614 reads out the record with the commodity code from the file F1. The information generation section 1614 reads out the record with the characteristic code from the file F2. The information generation section 1614 generates the screen layout including the information of these records in FIG. 8 and sends the screen layout to the display devices 106 and 109 (Act20). The sending section 1615 sends the commodity code and the characteristic code to the POS terminal 11 (Act21).

The microcomputer 160 judges whether or not the reading of all the commodities is ended (Act22). The microcomputer 160, for example, may carry out the judgment based on the OFF signal from the POS terminal 11. If the reading is not ended, the microcomputer 160 carries out Act12. If the reading has been ended, the image input section 161 sends the OFF signal to the image sensor 164.

Figure 10:
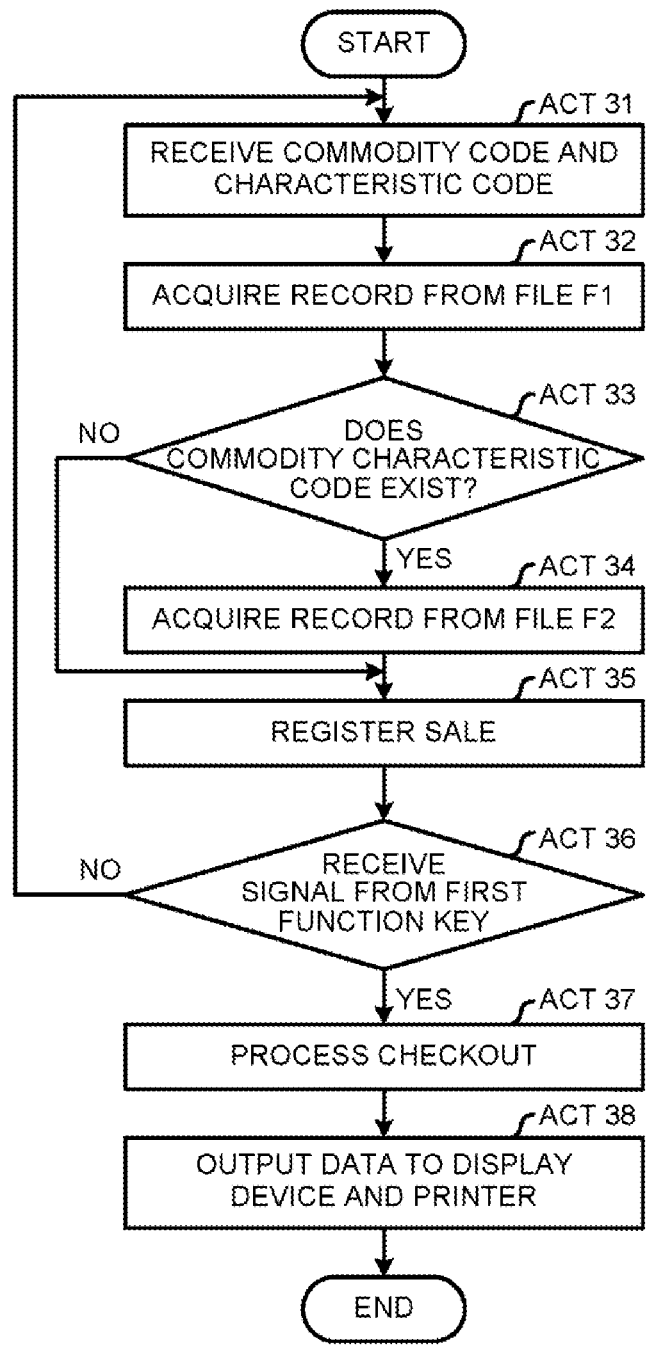
FIG. 10 is a processing flow of a program executed by the CPU of the POS terminal of the first embodiment.

FIG. 10 shows a processing flow of the program executed by the CPU61 of the POS terminal 11. The reception section 611 receives the commodity code and the characteristic code from the sending section 1615 (Act31). The information acquisition section 612 reads out the record with the commodity code from the file F1 (Act32). The information acquisition section 612 checks whether or not the reception section 611 receives both of the commodity code and the characteristic code (Act33). If the characteristic code does not exist, a program PR carries out Act35. If the characteristic code exists, the information acquisition section 612 reads out the record with the characteristic code from the file F2 (Act34).

The information acquisition section 612 stores the records acquired from the files F1 and F2 in the transaction file F3 (Act35). The calculation section 614 completely extracts the records with the unique ID denoting one transaction in the records stored in the transaction file F3. The calculation section 614 calculates the total amount of one transaction according to the unit price and the number of the records.

The CPU61 confirms whether or not the signal of the first function key 22e is received (Act36). If the signal from the first function key 22e does not exist, the 31 is carried out Act31. If the signal from the first function key 22e exists (Act36: Yes), the checkout processing section 615 waits the input of amount data from the keyboard 22 and the second function key 22f.

Once the checkout processing section 615 senses the input from the second function key 22f, the calculation section 614 calculates the change. The checkout processing section 615 extracts the necessary information from the records acquired from the files F1, F2 and F3 (Act37). The checkout processing section 615 appends the extracted information to receipt data. The display devices 23 and 24 further display the information (Act38).

In the first embodiment, the first commodity data is data different from the second commodity data. But, the first recognition section 1612 may be also capable of calculating the similarity ratio based on the second commodity data. In this case, the first recognition section calculates the similarity ratio in the condition that the information of the symbol CS does not exist.

In the first embodiment, the second recognition section 1613 demands the symbol CS. But, the second recognition section 1613 may also judge by the calyx of the vegetable or the fruit as the symbol CS.

In the first embodiment, the commodity reading apparatus 101 sends the commodity code and the characteristic code to the POS terminal 11. But, the commodity reading apparatus 101 may also send the record to the POS terminal 11.

A second embodiment will be described with reference to FIG. 11 to FIG. 13. The second embodiment is an example applied to a traceability system by which a user acquires the commodity characteristic information by a mobile terminal.

Figure 11:
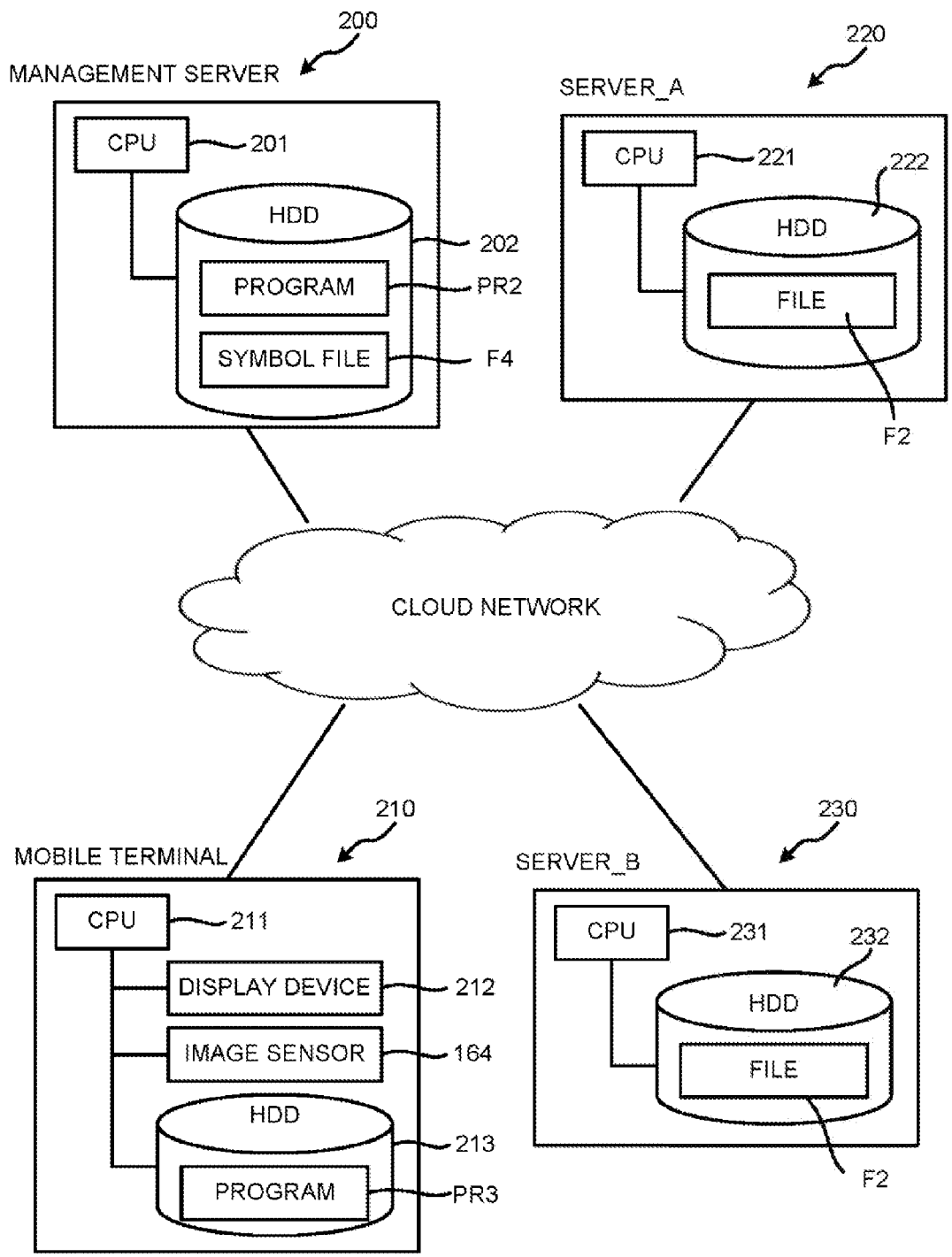
FIG. 11 is a system block diagram of a traceability system of a second embodiment.

FIG. 11 is a diagram of a system block of the traceability system. The traceability system at least includes a management server 200, the mobile terminal 210, a server 220 and a server 230. Each device is connected by a cloud network.

The management server 200 at least includes a CPU 201 and an HDD 202. The HDD 202 stores a program PR2 and a file F4. The CPU 201 executes the program PR2.

The mobile terminal 210 at least includes a CPU 211, a display device 212, the image sensor 164 and an HDD 213. The HDD 213 stores a program PR3. The CPU 211 executes the program PR3. The programs PR2 and PR3 include the second recognition sections 1613.

The server 220 at least includes a CPU 221 and an HDD 222. The HDD 222 stores a file F2-1. The server 230 at least includes a CPU 231 and an HDD 232. The HDD 232 stores a file F2-2. The files F2-1 and F2-2 preferentially have a structure the same as that of the file F2 described in the first embodiment. The name of the server 220 is defined as "server_A", and the name of the server 230 is defined as "server_B".

The manager of the file F2-1 is different from that of the file F2-2. The manager is the producer, an agricultural group, an enterprise and the like. The managers may prepare the file F2 for themselves. The second embodiment is described by using three physical server devices and two files F2, but is not limited to that. The numbers of the physical server devices and the files F2 are respectively more than one.

Figure 12:
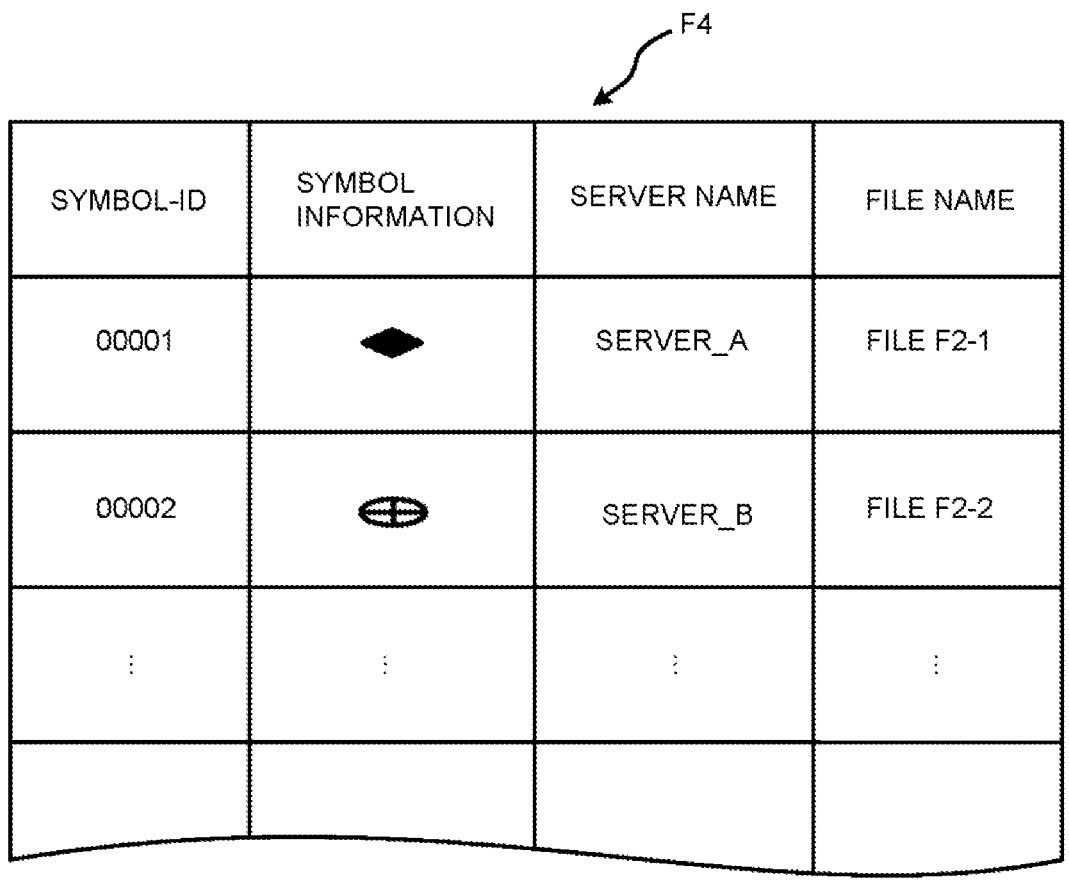
FIG. 12 is a schematic structural diagram of a file F4 of the second embodiment.

FIG. 12 shows a schematic structural diagram of the file F4. The file F4 is a table controlled by using the SQL language. The record of the file F4 includes a plurality of field values. The file F4 includes the field values of a symbol ID, symbol information, a server name and a file name. The symbol ID is the primary key used for uniquely specifying each record. The symbol information, for example, is the image data denoting the form of the symbol CS. The server name is the name of the server connected with the management server 200. The file name is the name of the file F2 connected with the management server 200.

The management server 200 may specify an address of the file F2 by the received symbol CS. For example, when the management server 200 receives the image data of the symbol CS whose symbol ID is "0001", the management server 200 accesses the file F2-1 of the server_A.

Figure 13:
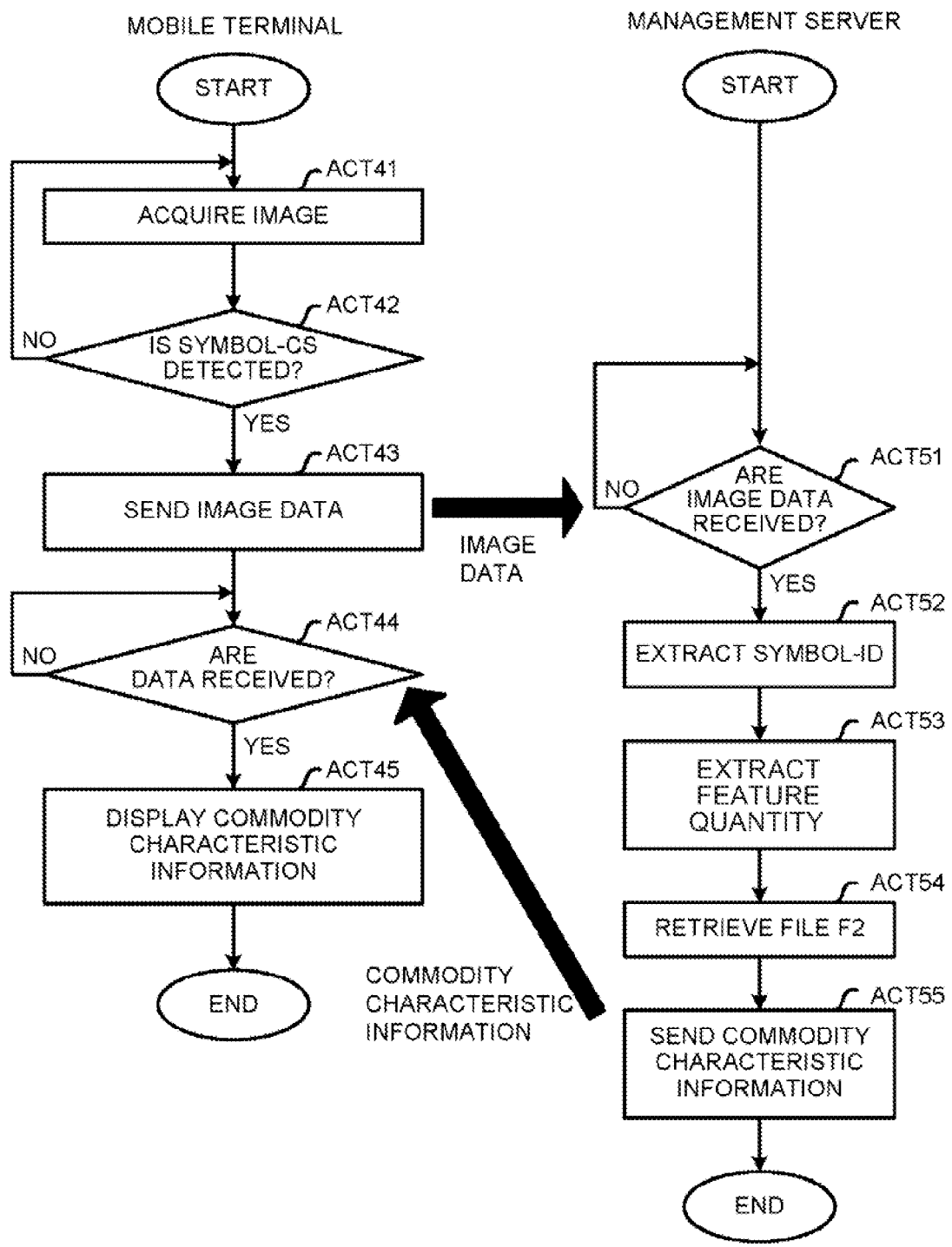
FIG. 13 is a processing flow of programs executed by CPUs of a management server and a mobile terminal of the second embodiment.

FIG. 13 shows a processing flow of the programs executed by the CPUs of the management server 200 and the mobile terminal 210. The mobile terminal 210 executes the program PR3. The program PR3 generates a user interface in FIG. 6 and displays the user interface on the display device 212. The image sensor 164 acquires the image data (Act41). The program PR3 judges whether or not the symbol CS is included in the image data (Act42). If the image data include the symbol CS, the program PR3 sends the image data to the management server 200 (Act43). The mobile terminal 210 stands by for a response from the management server 200 (Act44).

The management server 200 stands by for the reception of the image data from the mobile terminal 210 (Act51). The management server 200 extracts the symbol CS of the image data once the image data are received. The program PR2 retrieves the field value of the symbol information in the file F4. The program PR2 extracts the record with the symbol CS (Act52). The program PR2 specifies the file F2 which is supposed to be accessed.

The second recognition section 1613 of the program PR2 extracts the feature quantity from the image data (Act53). The second recognition section 1613 retrieves the field value of the second commodity data of the file F2 based on the feature quantity (Act54). The program PR2 specifies the record of the file F2. The management server 200 sends the commodity characteristic information of the specified record to the mobile terminal 210 (Act55).

The mobile terminal 210 receives the commodity characteristic information (Act44). The program PR3 displays such a user interface in FIG. 7 on the display device 212 (Act45).

In the second embodiment, the processing of Act42 carried out by using the program PR3 is described, but is not limited to that. For example, the program PR2 of the management server 200 may also carry out the processing of Act42.

These embodiments explained the technology specifying the commodity characteristic information by using the flag and without using a bar code or a wireless IC tag. Even though for commodities of the same variety, the concave-convex status, color, and the pattern of the surface of each commodity may be different. The possibility that the concave-convex status, color, and the pattern of the commodity including the flag are coincident with that of other commodity may be further decreased. Therefore, the system is capable of reducing the data size of an image used for extracting the feature quantity. If the producer generates the second commodity data, the falsification of the data is more difficult than the bar code or the wireless IC tag which can exchange data.

In the disclosed embodiments, the processing can be accomplished by a computer-executable program, and this program can be realized in a computer-readable memory device. In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for providing commodity information, comprising:
    a storage module configured to store a plurality of data files, each data file corresponding to a commodity and including a plurality of data fields, each of the data fields comprising: commodity identification information data, symbol identification data, detailed commodity information data, and producer information data;
    a first recognition module configured to identify the commodity by comparing an input commodity image to the commodity identification information data;
    a second recognition module configured to identify a symbol on the commodity by comparing an input symbol image to the symbol identification data; and
    an output module configured to output the detailed commodity information data based on the identified commodity, and output the producer information data based on the identified symbol.

2. The system for providing commodity information according to claim 1, wherein the commodity identification data comprises feature quantity data calculated from an image of the commodity, and the symbol identification data comprises feature quantity data calculated from an image of the symbol.

3. The system for providing commodity information according to claim 1, further comprising:
    an image sensor configured to generate the input commodity image; and
    a symbol recognition module configured to determine whether the input commodity image includes the input symbol image.

4. The system for providing commodity information according to claim 3, wherein:
    if the symbol recognition module determines that the input commodity image does not include the input symbol image, the output module is further configured to output a user interface screen which directs a user to reorient the commodity so that the image sensor can generate a revised input commodity image data which includes the input symbol image.

5. The system for providing commodity information according to claim 4, wherein the user interface screen displays a current image data generated by the image sensor.

6. The system for providing commodity information according to claim 5, wherein
    the user interface screen includes a target, and the user interface screen is further configured to directs the user to reorient the commodity so that, in the current input image data, the symbol corresponds to the target mark.

7. The system for providing commodity information according to claim 1, wherein the commodity is a produce, and the producer information data comprises at least one of: a production district, a grade, a sugar content, a producer and a harvest date.

8. A method of providing commodity information comprising:
    accessing a storage module configured to store a plurality of data files, each data file corresponding to a commodity and including a plurality of data fields, each of the data fields comprising: commodity identification information data, symbol identification data, detailed commodity information data, and producer information data;
    identifying the commodity by comparing an input commodity image to the commodity identification information data;
    identifying a symbol on the commodity by comparing an input symbol image to the symbol identification data;
    outputting the detailed commodity information data based on the identified commodity; and
    outputting the producer information data based on the identified symbol.

9. The method of providing commodity information according to claim 8, wherein
    the commodity identification data comprises feature quantity data calculated from an image of the commodity, and
    the symbol identification data comprises feature quantity data calculated from an image of the symbol.

10. The method of providing commodity information according to claim 8, further comprising:
    generating the input commodity image; and
    determining whether the input commodity image includes the input symbol image.

11. The method of providing commodity information according to claim 10, wherein
    outputting a user interface screen which directs a user to reorient the commodity after determining that the input commodity image does not include the input symbol image, so that the image sensor can generate a revised input commodity image data which includes the input symbol image.

12. The method for providing commodity information according to claim 11, wherein the user interface screen displays a current image data generated by the image sensor.

13. The method for providing commodity information according to claim 12, wherein
    the user interface screen includes a target, and the user interface screen is further configured to directs the user to reorient the commodity so that, in the current input image data, the symbol corresponds to the target mark.

14. The method of providing commodity information according to claim 8, wherein
    the commodity is a produce, and the producer information data comprises at least one of: a production district, a grade, a sugar content, a producer and a harvest date.

15. A non-transitory computer readable storage medium that stores a computer program for causing a computer to perform a process for providing commodity information, the process comprising:
    accessing a storage module configured to store a plurality of data files, each data file corresponding to a commodity and including a plurality of data fields, each of the data fields comprising: commodity identification information data, symbol identification data, detailed commodity information data, and producer information data;

identifying the commodity by comparing an input commodity image to the commodity identification information data;

identifying a symbol on the commodity by comparing an input symbol image to the symbol identification data;

outputting the detailed commodity information data based on the identified commodity; and outputting the producer information data based on the identified symbol.

16. The non-transitory readable medium according to claim 15, further comprising:

generating the input commodity image; and determining whether the input commodity image includes the input symbol image.

17. The non-transitory readable medium according to claim 16, wherein outputting a user interface screen which directs a user to reorient the commodity after determining that the input commodity image does not include the input symbol image, so that the image sensor can generate a revised input commodity image data which includes the input symbol image.

18. The non-transitory readable medium according to claim 17, wherein the user interface screen displays a current image data generated by the image sensor.

19. The non-transitory readable medium according to claim 18, wherein the user interface screen includes a target, and the user interface screen is further configured to directs the user to reorient the commodity so that, in the current input image data, the symbol corresponds to the target mark.

20. The non-transitory readable medium according to claim 15, wherein the commodity is a produce, and the producer information data comprises at least one of: a production district, a grade, a sugar content, a producer and a harvest date.

* * * * *